Oct. 8, 1968

G. L. RODGERS 3,404,835

AUTOMOBILE AIR TEMPERATURE CONTROL

Filed Feb. 15, 1967

INVENTOR.
GERALD L. RODGERS
BY
*Yount, Raney, Flynn & Tardle*
ATTORNEYS

Oct. 8, 1968

G. L. RODGERS 3,404,835

AUTOMOBILE AIR TEMPERATURE CONTROL

Filed Feb. 15, 1967

INVENTOR
GERALD L. RODGERS
BY
Yount, Raney, Flynn & Tarolli
ATTORNEYS

United States Patent Office

3,404,835
Patented Oct. 8, 1968

3,404,835
AUTOMOBILE AIR TEMPERATURE CONTROL
Gerald L. Rodgers, Worthington, Ohio, assignor to Ranco Incorporated, Columbus, Ohio, a corporation of Ohio
Filed Feb. 15, 1967, Ser. No. 616,269
10 Claims. (Cl. 236—13)

ABSTRACT OF THE DISCLOSURE

A temperature control system for an automotive vehicle comprises duct means for directing a flow of air into the passenger compartment of the vehicle, a heat exchanger in the duct means for transferring heat to the air, a blower for providing a forced flow of air in the duct means, a vane-like member for directing proportions of air in the duct means across the heat exchanger and which member is movable to change the proportion of air directed to the heat exchanger so as to vary the temperature of air directed to the passenger compartment, electrically energized actuating means for moving the vane-like member and circuitry including an amplifier having a temperature responsive input circuit for controlling the electrically energized actuating means in response to passenger compartment temperature.

---

A principal object of the present invention is the provision of a new and improved temperature control system for vehicles equipped with an air tempering means and including an electrically energized servo and a linkage associated therewith for driving a valve or the like which controls the supply of a tempering medium in the system, electronic amplifier means for energizing the servo and having one or more temperature sensors governing operation of the amplifier, and which is inexpensively manufactured, operable to accurately maintain air temperatures in the passanger compartment within relatively narrow limits, installable without the necessity of calibration and which performs reliably under substantially all environmental extremes likely to be encountered by the automotive vehicle.

Another object of the present invention is the provision of a new and improved temperature control system as set forth in the next preceding paragraph wherein the amplifier means includes a differential amplifier including first and second transistors and third and fourth transistors respectively connected in the output circuits of the differential amplifier and controlled thereby to control energization of the servo and in which all of the transistors are of the same type and the circuitry is so constructed that differences in sensitivity between the similar transistors have substantially no effect on the operation thereof.

Another object of the present invention is the provision of a new and improved temperature control system for an automotive vehicle and including a heat exchanger, duct means for directing air to the heat exchanger and to a passenger compartment of the vehicle, means including a movable member for varying the amount of heat transfer between the heat exchanger and air entering the passenger compartment, an electrically energized actuating means for effecting controlled movement of the member, and circuitry for controlling operation of the actuating means in response to a sensed temperature in the passenger compartment and which circuitry includes amplifier means comprising first and second transistors having their output circuits connected to terminals of the actuating means to provide an energizing voltage thereacross and with the control electrode of the transistors connected in output circuits of a differential amplifier which has an input signal which varies in response to a sensed temperature and controls voltage in the output circuits thereof so that the actuating means is energized in response to such variation and wherein position responsive feedback means are provided for varying the input signal in the differential amplifier in response to operation of the actuating means, whereby the actuating means is rendered ineffective to produce further movement of the member when the member is in a position dictated by the sensed temperature.

Another object of the present invention is the provision of a new and improved temperature control system as set forth in the next preceding paragraph wherein the actuating means includes a direct current permanent magnet field motor the winding of which produces a counter EMF in response to an energizing voltage applied thereto and wherein the circuitry is constructed so that such counter EMF controls conduction in an output circuit of one of the transistors providing gradual buildup of energizing potential thereto and smooth controlled starting of the motor so that hunting of the movable member is minimized.

Still another object of the present invention is the provision of a new and improved automotive temperature control system as set forth in the next preceding paragraph wherein the actuating means includes a direct current servomotor energized through an amplifier from the battery of the vehicle and with the sense, or direction, of temperature change in the passenger compartment determining the direction of movement of the motor and wherein there is a position responsive feedback means which includes a potentiometer in the input circuit of the amplifier which is effective to equalize the input signals in the amplifier when the member reaches a position dictated by the sensed temperature.

A still further object of the present invention is the provision of a new and improved automotive temperature control system as set forth in the next preceding paragraph wherein the movable member includes a door-like vane effective to direct portions of air in the duct means across the heat exchanger to heat such portions of the air so that a heated and fresh air mixture is directed into the passenger compartment at a desired temperature and which temperature depends upon the position of the vane.

Other objects and advantages of the present invention will become apparent from the consideration of the following detailed description thereof and from the accompanying drawings which form a part of the specification and wherein.

Figure 1:
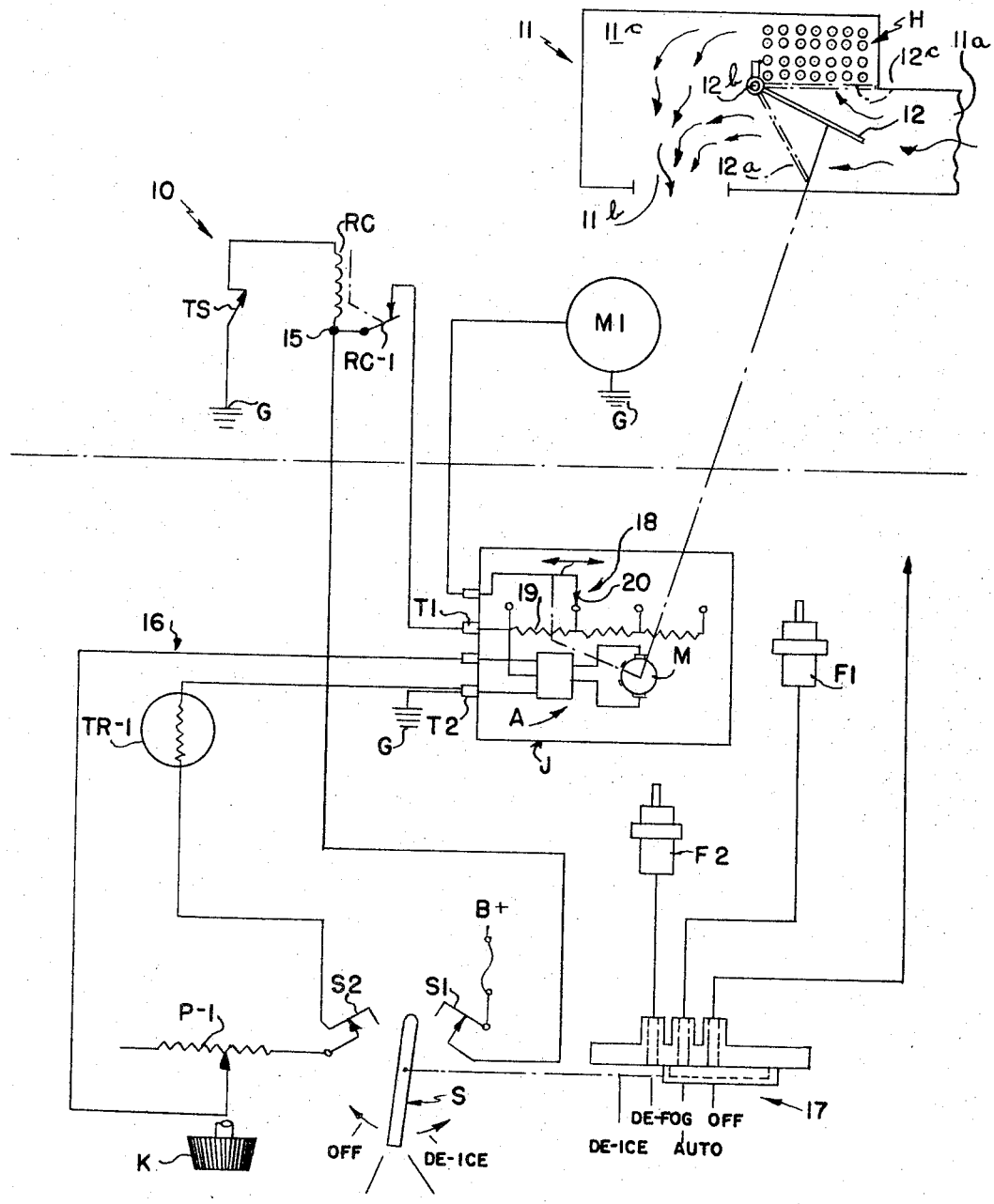
FIG. 1 is a schematic illustration of an automotive temperature control system embodying the present invention.

As representing a preferred embodiment of the present invention, FIG. 1 illustrates an automotive temperature control system 10 which provides a controlled mixture of temperature conditioned air and air at ambient temperature to the passenger compartment of an automotive vehicle or the like, not shown, and which system includes an air tempering means comprising a duct system 11 having a heat exchanger H therein, a vane 12 disposed in the duct system and movable to control air flow through the heat exchanger, and a control circuit A, including a motor M which effects positioning of the vane in response to sensed temperature.

The duct system 11, only a portion of which is shown, is provided for directing fresh ambient air into the passenger compartment of an automobile, with the fresh air flowing from an inlet duct portion 11a and being discharged from the duct system through an outlet portion 11b. The duct system includes an offset portion 11c in which the heater core or heat exchanger H is disposed. The heater core is of a well known construction and heated liquid, such as water, from the automobile engine cooling system is circulated through the core in a conventional manner. In the preferred embodiment, portions of the air flowing in the duct 11 may be diverted and passed through the heater by the vane 12, which is sometimes termed a "blend door," which comprises a vane member pivoted on an axis 12b and which is adapted to be moved on its pivot to any position between the extreme positions indicated in broken lines at 12c, 12d. By this arrangement the amount of heat in the air discharged into the passenger compartment can be controlled.

As mentioned, the relative amount of outside or ambient air which is passed across the heater core H depends upon the positioning of the blend door 12. If the blend door is in its position 12c, illustrated by broken lines, no air passes across the heater core H, and when the blend door is in its position illustrated by the broken line position 12d, all of the air from the duct portion 11a passes across the heater core. It is apparent that when the blend door is in a position intermediate those positions illustrated by the broken lines 12c and 12d, the heated air and outside air mixes adjacent the opening 11b to provide tempered air to the passenger compartment, the temperature of which depends on the blend door position.

The position of the vane or blend door 12 is controlled by a direct current permanent magnet field motor M, which is mechanically linked to the blend door and is electrically connected between terminals B+ and G of a direct current power supply, such as a 12 volt battery of the vehicle, by closing of contacts S1 of a control switch S, which is manually operated by an occupant of the vehicle from an "off" position to an automatic, "de-fog" or "de-ice" position as will be described in more detail presently. The motor M is energized to drive the blend door 12 with energization of the motor controlled by the amplifier circuit A, which will be described presently, in response to sensed air temperatures in the passenger compartment of the vehicle.

The motor M and amplifier A are suitably contained within a servo-unit J, which is conveniently mounted under the dash panel of the vehicle, and are connected between a positive terminal B+ of the power supply through a suitable fuse, contacts S1 of the control switch S, a junction 15, relay contacts RC1 of a relay RC, a terminal T1 of the servo-unit J, and the ground terminal G of the power supply through the terminal T2 of the servo-unit J. The relay contacts RC1 are open when the relay RC is de-energized and closed in response to energization of the relay RC through an energization circuit from the terminal B+ through the fuse, contacts S1 of the switch S, junction 15, the relay coil RC, closed contacts of a temperature responsive switch TS and to the terminal G of the power supply. The switch TS is operable in response to engine coolant temperatures and is open when engine coolant temperatures are below a predetermined temperature and closed when the engine is warmed up sufficiently to increase the temperature of the coolant above the predetermined temperature which is preferably about 115° F. Thus, the servo-unit J is maintained inoperative during the brief period required to heat up the engine coolant just after a cold engine is started, and the possibility of a forced flow of low temperature ambient air into a passenger compartment during such period is eliminated. With the control switch S positioned to close the contacts S1 thereof the relay coil RC is energized when the vehicle engine is warm and the contacts RC1 are therefore closed during normal operation of the vehicle.

When the switch S has been moved from its "off" position so that the contacts S1 thereof are closed, and the vehicle engine is warmed up as described, power is supplied to the amplifier A which in turn controls operation of the motor M. The amplifier A includes input circuit means 16, a part of which is shown in FIG. 1 and which input circuit includes a temperature responsive resistor, or thermistor, TR1 suitably positioned in the passenger compartment and connected in series with a temperature selector potentiometer P1 which is manually set by an occupant of the vehicle by manipulation of the knob K so as to permit selection of a desired temperature in the passage compartment. The knob K is preferably associated with suitable indicia, not shown, which relates the knob position to desired passenger compartment temperature.

Operation of the amplifier A and consequently the motor M is controlled by the resistance in the input circuit 16 and this resistance is variable in response to sensed temperature in the passenger compartment as well as variation of the potentiometer P1. Operation of the amplifier and motor will be described in greater detail hereinafter however, suffice it to say that when the temperature within the passenger compartment of the vehicle increases above a preselected temperature, as determined by the setting of the potentiometer P1, the input circuit resistance is changed resulting in the blend door 12, being moved toward its position 12c, and when the temperature in the passenger compartment of the vehicle decreases below the preselected temperature, the resulting change in input circuit resistance causes the blend door 12 to be moved toward its position 12d.

The switch S is, in the preferred embodiment, mechanically linked to a valve means 17 which communicates between a source of vacuum pressure at the vehicle engine and fluid motors associated with conventional dampers, not illustrated, in the duct means 11 so that positioning of the dampers in the duct means is controlled by positioning of the switch S in any of its positions, "off," "auto," "de-fog" or "de-ice." More specifically, when the switch S is moved to its "auto" position, the valve 17 is actuated so as to communicate the fluid motor F1 to a source of vacuum pressure at the vehicle engine and thereby actuate a damper (not shown) in the duct means to admit fresh, or ambient air to the duct means. Movement of the switch S to its "de-fog" position communicates the fluid motor F2 with the vacuum source to move a damper (not shown) associated therewith to a position wherein fresh, heated air from the duct means is exhausted from the duct means along the windshield (not shown) of the vehicle. When the switch S is moved to its "de-ice" position, the contacts S2 thereof are opened to interrupt the input circuit 16 resulting in movement of the blend door 12 to its position 12d so as to provide a flow of maximum temperature air along the windshield of the vehicle.

The motor M is also mechanically linked to a suitable speed control switch 18 (illustrated diagrammatically) in the servo-unit J which controls the speed of a blower motor M1 by stepwise changes in the resistance of the motor energizing circuit. Increasing the speed of the blower motor increases the quantity of heated air introduced into the passenger compartment at a particular blend door position. The energization circuit for the blower motor M1 can be traced from the terminal B+ of the power supply, through the fuse, contacts S1 of the switch S, junction 15, relay contacts RC1, terminal T1 of the servo-unit J, through a resistor 19, a movable contact 20 of the switch 18, the windings of the blower motor M1 and to the terminal G of the power supply. The contact 20 of the switch is movable by operation of the motor M in the directions indicated by the arrows in FIG. 1 so as to connect a greater or fewer number of resistors in series with the blower motor M1. The switch 20 is preferably a rotary switch, however it can be of any suitable construction If infinite variation in speed of the motor M1 is desired, a variable power resistor can be substituted for the switch 18.

The motor M includes terminals 25, 26 (see FIG. 2) which are connected to the terminals B+ and G of the battery through circuit means, described in detail hereinafter, and which circuit means is operative to control the magnitude and sense of the voltage across the motor terminals 25, 26 of the motor M to stop the motor or drive it in one direction or the other, respectively. Thus, when the voltage at the motor terminal 26 is negative with respect to the voltage at the terminal 25, a circuit is completed through the windings of the motor M to effect rotation of the armature of the motor in a first direction of rotation, and when the voltage at the terminal 26 is positive with respect to the voltage at the terminal 25, the armature of the motor rotates in an opposite direction of rotation. Of course when the voltage levels at the terminals 25, 26, are substantially equal, the motor is not driven.

As noted, the armature of the motor is drivingly connected to the blend door 12 by the linkage L1 which is schematically illustrated herein but which preferably comprises a suitable gear train. When the voltage at the motor terminal 26 is positive with respect to the terminal 25, the armature of the motor M is driven in a direction to move the blend door 12 toward its limit position 12d, and when the voltage at the terminal 26, is negative with respect to the terminal 25, the motor M is driven to move the blend door 12 toward its limit position 12c. As previously mentioned, when the voltage at the terminal 26 is substantially equal to the voltage at the terminal 25, the motor M is not driven and the blend door 12 is maintained in the particular position to which it was previously moved by the motor. From the above it should be apparent that the direction and extent of movement of the blend door 12 is dependent upon the sense, or direction, of the voltage across the terminals 25, 26 of the motor M and the duration of such voltage, respectively.

The circuit A is connected between the battery terminals B+ and G through the switch contacts S1 as described and controls the voltage across the terminals 25, 26 of the motor M to thereby control operation of the motor and consequently, the position of the blend door 12 and temperature of the conditioned air entering the passenger compartment. The circuit A includes transistors Q1, Q2 which are connected in parallel branches of a differential amplifier A1 and having collector-emitter or output circuits 27, 28 connected to the motor terminals 25, 26, respectively, so that conduction in the output circuits controls the voltage levels at the motor terminals.

The voltage at the terminal 25 of the motor M is determined by conduction in the output circuit 27 which can be traced from the terminal B+ through the switch contacts S1, junctions 30, 31, 32 and 33, a resistor R1, terminal 25, the collector 35 and emitter 36 of the NPN transistor Q1, a junction 37, a resistor R2, junctions 38, 39 and to the terminal G of the power supply. Voltage at the terminal 26 of the motor M is determined by conduction in the output circuit 28, which can be traced from the terminal B+ through the switch contacts S1, junctions 30–33, a resistor R3, the terminal 26, the collector 40 and emitter 41 of the NPN resistor Q2, the junction 37, resistor R2, junctions 38, 39, and to the terminal G.

When the output circuits of the transistors Q1, Q2 are conducting equally there is no voltage across the motor M since the resistors R1, R3 are of equal resistance. When conduction in the collector-emitter circuit of the transistor Q2 increases, the voltage drop across the resistor R3 is increased, resulting in a correspondingly reduced voltage at the terminal 26, and an increased voltage level at the junction 37. The increase in voltage at the junction 37 has the effect of reducing the forward voltage across the base-emitter circuit of the transistor Q1 and thus decreases conduction in the collector-emitter circuit thereof to produce a correspondingly increased voltage at the motor terminal 25. When this voltage difference across the motor M has increased to a predetermined level the motor is energized to be driven through an energizing circuit from the terminal B+ through the junctions 30–33, resistor R1, the motor M, the collector-emitter circuit of the transistor Q2, junction 37, resistor R2, junctions 38, 39, and to ground G.

When conduction in the collector-emitter circuit of the transistor Q2 is reduced below the level at which a null exists across the motor M, the voltage at the terminal 26 increases and the voltage at the terminal 25 decreases, with the changes in voltage at the terminals being brought about in reverse of the manner described above with the motor being energized from the terminal B+ through junctions 30–33, resistor R3, the motor M, the collector-emitter circuit of the transistor Q1, junction 37, resistor R2, and to the ground G. The transistors Q1, Q2 are like transistors, and since the resistors R1, R3 are similar, a positive change in voltage at the terminal 26, with respect to its voltage at a null condition, is accompanied by a negative change in voltage of substantially equal magnitude at the terminal 25, and vice versa. If for example, from a null condition the voltage at the terminal 26 decreases one volt, the voltage at the terminal 25 increases approximately one volt, resulting in two volts across the motor terminals.

Conduction in the collector-emitter circuits of the transistors Q1, Q2 is controlled by a second differential amplifier generally designated A2 including transistors Q3, Q4 and which have their input and output circuits connected in parallel across the terminals of the power supply and with the output circuits thereof connected to the base, or control, electrodes 42, 43 of the transistors Q1, Q2, respectively. The input circuit of the transistor Q3 can be traced from the terminal B+ through the switch contacts S1, junctions 30, 31, a resistor R4, a junction 44, the emitter 45 and base 46 of the transistor Q3, a junction 47, a resistor R5, a junction 50, a resistor R6, a junction 51, junctions 38, 39 and to the terminal G of the power supply. The resistors R5, R6, are connected in series with a resistor R7 to form a voltage divider which establishes a predetermined voltage level at the junction 47 and the base or control electrode 46 of the transistor Q3, to which the junction 47 is connected. The resistance values of the resistors R4–R7 are chosen so that the voltage at the emitter 45 of the transistor Q3 is positive with respect to the voltage provided at the base 46 thereof so that conduction is normally maintained in the emitter-base circuit of the transistor Q3.

Establishment of the emitter-base circuit in the transistor Q3 results in transistor action of that transistor to maintain the emitter-collector circuit thereof conductive, as is known. The emitter-collector or output circuit of the transistor Q3 is completed from the terminal B+ through the junctions 30, 31, resistor R4, junction 44, emitter 45 and collector 52 of the transistor Q3, a resistor R8, a junction 53, resistor R9, junctions 51, 38, 39, and to the terminal G of the power supply.

The resistors R8, R9 are series connected resistors which cooperate to provide a voltage dividing network for maintaining a voltage level at the junction 53 and the control electrode 42 of the transistor Q1 which increases and decreases in response to increases and decreases in conduction in the emitter-collector circuit of the transistor Q3. The voltage provided at the junction 53 is normally positive with respect to the voltage at the emitter 36 of the transistor Q1 so that a normally conducting base-emitter circuit in the transistor Q1 is established from the junction 53 through the base 42 and emitter 36 of the transistor Q1, the junction 37, resistor R2, junctions 38, 39, and the terminal G of the power supply. It is apparent that when the voltage provided at the junction 53 changes relative to the voltage at the emitter 36 of the transistor Q1 in response to a change in conduction in the emitter-collector circuit of the transistor Q3, conduction in the collector-emitter circuit of the transistor Q1 changes accordingly, thereby changing the voltage at the terminal 25 of the motor M.

The emitter-base or input circuit of the PNP transistor Q4 is associated with the input circuit means 16 for providing a variable input signal thereto and which circuit means includes potentiometers P2, P1 and the temperature responsive resistor, or thermistor, TR1. The emitter-base circuit of the transistor Q4 is connected across the terminals B+ and G of the power supply and can be traced from the terminal B+ through the switch contacts S1, the junctions 30, 31, the resistor R4, junction 44, the emitter 53, and base 54 of the transistor Q4, a resistor R10, the potentiometers P2, P1, the switch contacts S2, the temperature responsive resistor, or thermister TR1, and to the terminal G of the power supply. The potentiometers P1, P2 and the thermistor TR1 are connected in series with a resistor R14 and potentiometer P3 to form a voltage dividing network connected across the terminals of the power supply and connected to the base electrode 54 of the transistor Q4 through a resistor R10. The voltage dividing network just referred to, establishes a voltage at the base 54 of the transistor Q4 which is variable in a manner to be described, and is effective to control conduction in the emitter-base circuit thereof so that the emitter 53 of the transistor Q4 is positive with respect to the voltage at the base 54 thereof by an amount determined by the elements of the voltage dividing network, and conduction in the emitter-base circuit of the transistor Q4 varies according to such voltage difference.

Conduction in the emitter-base circuit of the transistor Q4 establishes an emitter-collector, or output, circuit therein from the terminal B+ through the junctions 30, 31, the resistor R4, junction 44, the emitter 53 and collector 55 of the transistor Q4, a resistor R16, a junction 56, a resistor R17, the junction 39, and to the terminal G of the power supply.

The resistors R16, R17 combine to provide a voltage divider which is effective to establish a voltage at the base 43 of the transistor Q2 having a magnitude which depends upon the amount of conduction in the emitter-collector circuit of the transistor Q4. The aforementioned voltage at the base of the transistor Q2 is normally positive with respect to the emitter 41 thereof, and establishes a base-emitter circuit of the transistor Q2 through the emitter-collector circuit of the transistor Q4, the junction 56, the base 43 and emitter 41 of the transistor Q2, junction 37, resistor R2, junctions 38, 39, and to the terminal G of the power supply. Conduction in the base-emitter circuit of the transistor Q2 renders the collector-emitter circuit thereof conductive to an extent governed by the voltage across the base and emitter electrodes 43, 41 and depending on the amount of conduction in the transistor Q4.

As noted previously, the transistors Q1, Q2 are like transistors and the fixed resistors R1, R3 are of the same resistance value. Moreover, the transistors Q3, Q4 are like transistors and the voltage dividers formed by the resistors R8, R9, and R16, R17, respectively, connected in the emitter-collector circuits of the transistors Q3, Q4 are identical. For these reasons when the voltage levels at the base electrodes 46, 54 of the transistors Q3, Q4, respectively, are equal, a null exists across the motor M since the transistors Q1, Q2 and Q3, Q4 conduct equally. When the voltage at the base 54 of the transistor Q4 becomes positive with respect to the voltage at the base 46 of the transistor Q3, the transistors Q4, Q2 are rendered less conductive while conduction in the transistors Q3, Q1, is increased, thus causing the motor terminal 26 to become positive with respect to the terminal 25 thereof.

When the voltage level at the base 54 of the transistor Q4 changes negatively with respect to the null voltage, conduction in each of the transistors Q4, Q2 increases while conduction in each of the transistors Q3, Q1 decreases, causing the terminal 25 of the motor to become positive with respect to the terminal 26.

The voltage at the base electrode 54 of the transistor Q4 is variable in response to operation of elements of the input circuit means, and more particularly in response to variations in resistance of the potentiometers P1, P2 or the thermistor TR1. As mentioned above, the resistance of the potentiometer P1 is adjusted to permit selection of a desired temperature in the passenger compartment and includes a wiper 60 which is movable to change the resistance thereof in the usual manner and which wiper is connected to the knob K by a mechanical linkage L2 by which the wiper 60 is moved.

The thermistor TR1 is positioned at a suitable location in the passenger compartment of the automotive vehicle so that the temperature of the air ambient the thermistor determines its resistance. With the temperature selector potentiometer P1 adjusted to provide a particular temperature in the vehicle, the blend door 12 properly positioned to provide such temperature and the preselected temperature exists in the passenger compartment, the voltage levels at the control electrodes 54, 46 of the transistors Q4, Q3 are equal and the blend door 12 is maintained in its position so that the proportions of heated and unheated air supplied to the compartment are constant. If air temperature in the compartment changes, the change in temperature effects a change in resistance of the thermistor TR1 to produce what may be termed an "error" signal in the input circuit of the transistor Q4, since a change in resistance of the thermistor indicates that the blend door 12 is not in its correct position for delivering heated and unheated air to the passenger compartment in proportions which are sufficient to maintain the compartment at the preselected temperature. The "error" signal takes the form of a change in voltage level at the base of the transistor Q4 relative to the voltage level at the base of the transistor Q3 to thereby change the amount of conduction in the transistors Q3, Q4 to vary the voltage at the motor terminals, accordingly.

In the preferred embodiment, the thermistor TR1 has a negative temperature coefficient of resistance and when the resistance thereof decreases in response to a temperature increase, the voltage at the base 54 of the transistor Q4 decreases according, resulting in increase in potential at the terminal 26 of the motor M relative to the voltage at the terminal 25 thereof so that the blend door 12 is moved toward its position 12c to direct a smaller amount of air through the heater core H. Conversely, when the resistance of the thermistor TR1 increases in response to a temperature decrease, the voltage at the base 54 of the transistor Q4 increases, decreasing the voltage at the motor terminal 26 relative to the voltage at the terminal 25 and thereby causing the blend door 12 to be moved toward its position 12d to direct additional amounts of air across the heater core H.

The input circuit of the transistor Q4 additionally includes position sensing feedback means for altering the input, or error signal in response to movement of the blend door 12 to a position dictated by the temperature sensed in the passenger compartment by the thermistor TR1. The feedback means includes the potentiometer P2 having a wiper 61, and a linkage L3 interconnecting the wiper 61 of the potentiometer P2 and drive train L1 of the blend door 12, so that movement of the blend door toward its position 12c increases the resistance of the potentiometer P2 to reduce the error signal, while movement of the door toward its position 12d decreases the resistance of the potentiometer to reduce the error signal. It should be noted that the term "error signal" as used herein refers to a voltage at the base 54 of the transistor Q4 which is either positive or negative with respect to a voltage level at the base 54 which would produce a null across the terminals 25, 26 of the motor M. "Altering" or "reducing" the error signal refers to reducing the magnitude of the differential between the null voltage and that provided by the thermistor, rather than changing of the sense direction of the error signal.

If the temperature in the passenger compartment should increase above the preset desired temperature, the resistance of the thermistor TR1 decreases to produce the aforementioned error signal resulting in a voltage across the terminals 25, 26 of the motor M and movement of the blend door toward the position 12c of FIG. 1 to reduce the temperature of the air entering the passenger compartment. As the blend door 11 moves toward the position 12c, the resistance of the potentiometer P2 is increased by operation of the linkage L3 so that the error signal is continuously reduced, since the linkage L3 shifts the wiper 61 relative to the potentiometer R11 during movement of the blend door 12. When the error signal has been reduced sufficiently to effect de-energization of the motor M, the blend door is stopped in a new position which may be said to be dictated by the sensed air temperature and wherein air at a reduced temperature is delivered to the passenger compartment. Since the position sensing feedback potentiometer continuously reduces the error signal as the blend door 12 is moved, the blend door changes position with a minimum amount of hunting.

The linkage L3 may be of any suitable construction and therefore has been illustrated only diagrammatically. It should be noted that the linkage L3 need not be operated directly from the motor M of the linkage L1 but may instead be driven by the blend door 12, depending on the physical organization of the various parts of the control system.

The resistance of the potentiometer P3 is varied during factory calibration only and is not ordinarily changed during or after installation of the circuitry in the vehicle although it is possible to do when necessary.

The base 46 of the transistor Q3 and the base 54 of the transistor Q4 are coupled by a capacitor C1 which functions to prevent circuit transients from rapidly changing the voltage at a base electrode of one of these transistors relative to the voltage at the base of the other transistor, which might otherwise produce relatively large momentary voltage differences across the motor terminals 25, 26 resulting in high frequency oscillation and radiotion and possible static on a radio in the vehicle.

Those familiar with electric motors of the type referred to herein will appreciate that the armature, or rotor, of such a motor does not rotate until the voltage applied across the terminals of the motor reaches a particular level, the magnitude of which depends upon the design of the motor. Accordingly, a relatively small air temperature change in the passenger compartment may be sensed by the thermistor TR1 and effect a change in the relative conduction of the output circuits 27, 28 across which the motor is connected from a condition wherein a null exists across the terminals, to a condition wherein the voltage across the motor is just insufficient to rotate the armature thereof. As a result, a range of passenger compartment temperatures exists wherein the motor M is not effective to move the blend door even though a slight voltage exists across its terminals, and which range is defined as the "dead band" of the control.

The extent of the "dead band" is determined primarily by the relative sensitivity of the transistors Q1, Q2, and even though these transistors are like transistors, and cooperate as described above, sensitivity tolerances in the manufacture of the transistors themselves are such that the range of "dead band" temperatures tends to vary from control circuit to control circuit.

In the illustrated temperature control system, a resistor R18 is connected between the motor terminal 26 and the junction 50 between the resistors R5, R6. The resistor R18 provides negative feedback between the output circuit 28 of the first mentioned differential amplifier A1 and the input circuit of the transistor Q3 and has the effect of minimizing the differences in sensitivities of the transistors and maintaining a relatively constant, narrow, "dead band" for the control. When voltage at the motor terminal 26 rises relative to the voltage at the motor terminal 25, as a result of decreased conduction in transistors Q4, Q2, the voltage at the base 46 of the transistor Q3 is increased due to the negative feedback interconnection of the motor terminal 26 in the output circuit 28 and the base 46 of the transistor Q3, and increased conduction of the transistor Q3, is thus retarded. When the motor terminal 26 becomes negative with respect to the terminal 25, as a result of increased conduction in the transistors Q4, Q2, the negative feedback connection reduces the voltage at the base 46 of the transistor Q3 to encourage conduction in the transistor Q3.

The effect of the negative feedback connection is to provide a relatively uniform dead band in control systems manufactured in accordance with the invention by minimizing differences in sensitivity of the similar transistors in the circuitry. More particularly, the feedback connection reduces the effective sensitivity of all of the transistors in the circuitry with the transistors which are relatively highly sensitive being effected thereby to a greater extent than transistors having a relatively low sensitivity.

Figure 2:
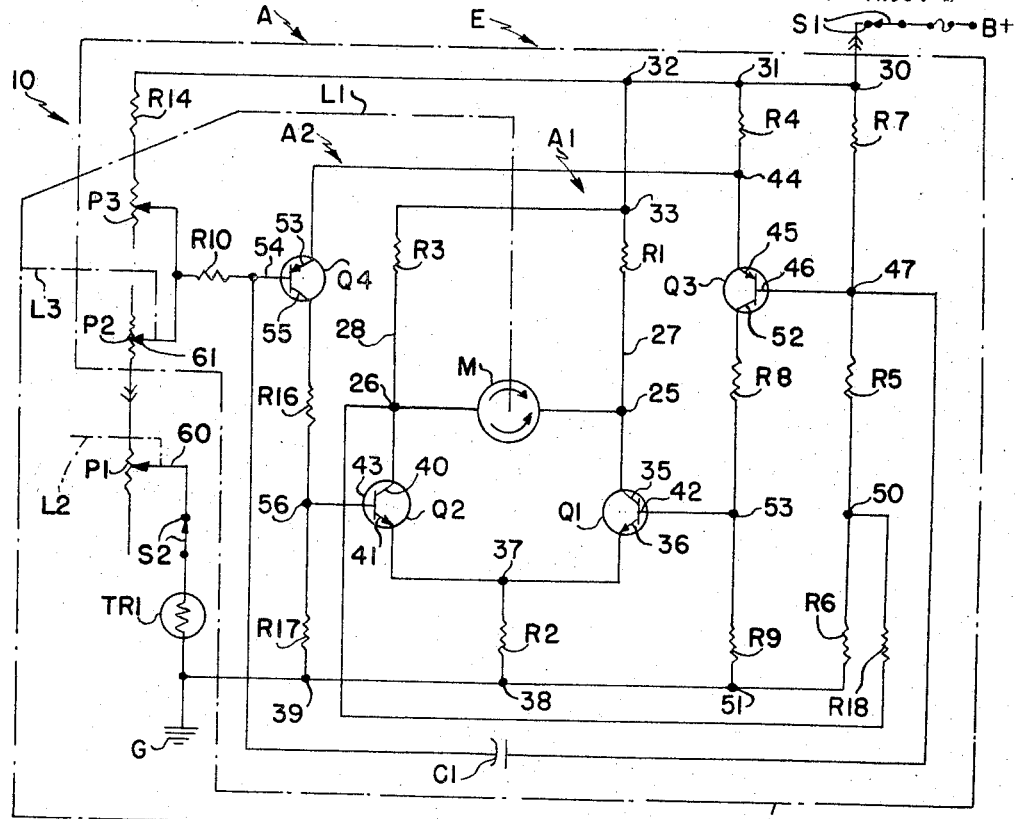
FIG. 2 is a portion of the automotive temperature control system of FIG. 1.
Figure 2:
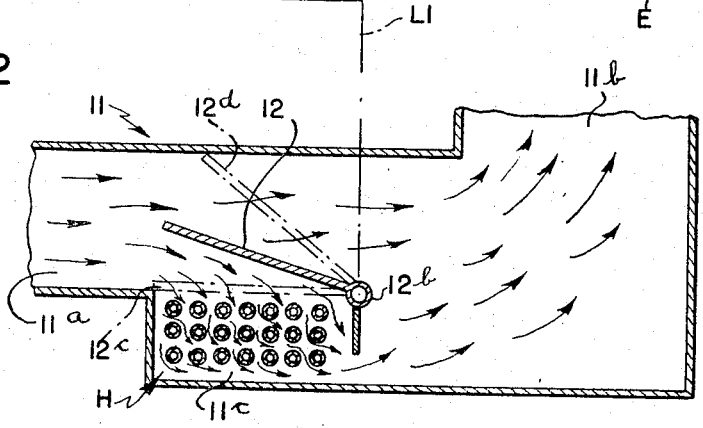

As illustrated in FIG. 2, the elements of the circuit A, except the thermistor TR1 and temperature selector potentiometer P1 are contained within a suitable enclosure E schematically illustrated by broken lines. Conductors extending out of the enclosure E are suitably connected to the terminal B+, and ground G through the potentiometer P1, thermistor TR1 and switch contacts S2, respectively. The resistor R10 connected to the base 54 of the transistor Q4 is effective to prevent dangerously large emitter-base current in that transistor if the conductor associated therewith is inadvertently connected directly to ground rather than the potentiometer P1 and thermistor TR1.

As noted above, when the switch arm S is moved to its "de-ice" condition the contacts S2 are opened to interrupt the signal circuit 16 and provide a flow of maximum temperature air along the windshield of the vehicle. Opening of the contacts S2 raises the voltage at the base electrode 54 of the transistor Q4 to the voltage at the terminal B+ of the power supply and results in maximum voltage across the terminals 25, 26 of the motor M thereby driving the blend door 12 to its position 12d for providing maximum temperature air flow into the passenger compartment.

Figure 3:
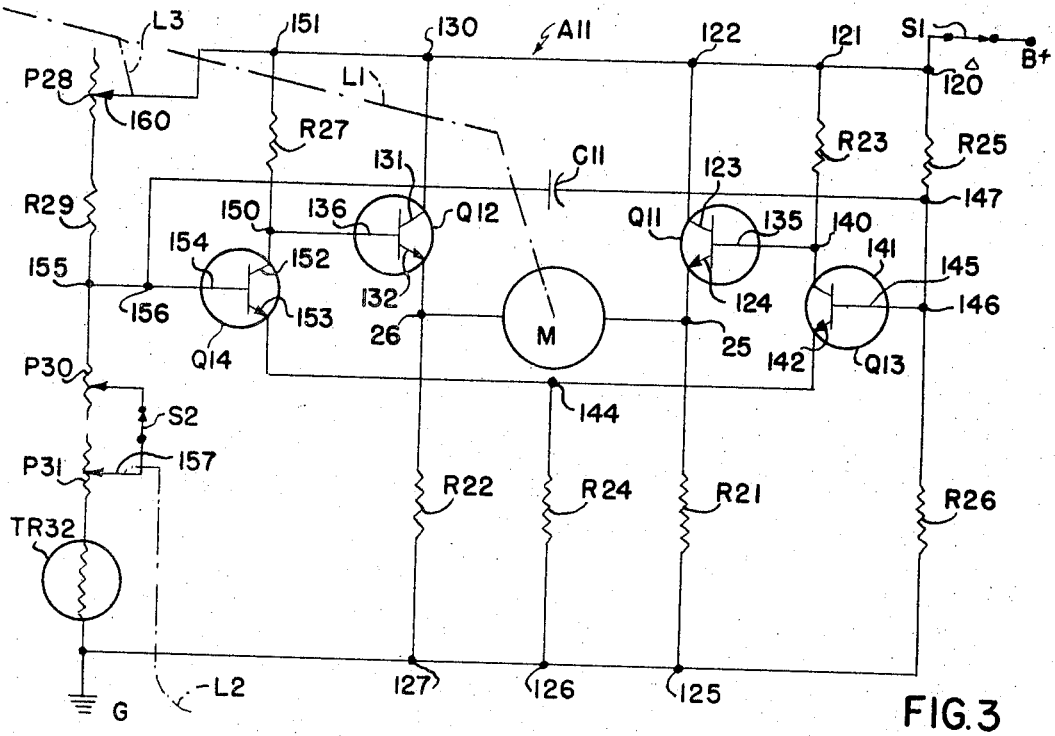
FIG. 3 is a schematic representation of a modified portion of a temperature control system embodying the invention.

FIG. 3 illustrates a temperature control system embodying the invention wherein a modified circuit A11 is utilized in conjunction with the motor M and duct system 11 to control the temperature of air in the passenger compartment of an automotive vehicle.

The circuit A11 is connected between the battery terminals B+ and G through the switch contacts S1 and controls the voltage across the terminals 25, 26 of the motor M to thereby control operation of the motor and consequently, the position of the blend door 12 and the temperature of the conditioned air entering the passenger compartment. The motor terminals 25, 26 are connected in the collector-emitter or output circuits of transistors Q11, Q12, respectively with conduction in the output circuits of the transistors Q11, Q12 controlling the voltage at the respective motor terminals connected thereto.

The voltage at the motor terminal 25 is determined by conduction in the collector-emitter circuit of the transistor Q11 which circuit can be traced from the battery terminal B+ through the switch S1, a junction 120, junctions 121, 122, the collector 123, and the emitter 124 of the transistor Q11, the terminal 15, a resistor R21, a junction 125, junctions 126, 127, and to the terminal G. The voltage level at the motor terminal 26 is controlled by conduction in the collector-emitter circuit of the transistor Q12 which can be traced from the terminal B+ through the switch S1, junctions 120, 121, 122, junction 130, collector 131 and emitter 132 of the transistor Q12, the motor terminal 26, a resistor R22, junction 127 and to the ground terminal G.

When the output circuits of the transistors Q11, Q12 are conducting equally, there is no voltage across the motor M since the resistors R21, R22 are of equal resistance. When conduction in the collector-emitter circuit of the transistor Q12 decreases, the voltage drop across the resistor R22 increases resulting in a correspondingly increased voltage at the terminal 26 of the motor M. When conduction in the collector-emitter circuit of the transistor Q12 decreases, the voltage at the motor terminal 26 decreases accordingly. Similarly, when conduction in the collector-emitter circuit of the transistor Q11 increases, the voltage at the motor terminal 25 increases and when conduction in the collector-emitter circuit of the transistor Q11 decreases, the voltage at the motor terminal 25 decreases accordingly.

Conduction in the collector-emitter circuits of the transistors Q11, Q12 is controlled by a differential amplifier including transistors Q13, Q14, the output circuits of which are connected to the base or control electrodes 135, 136 of the transistors Q11, Q12 respectively. The transistors Q11, Q12 are related to the output circuits of the differential amplifier so that an amplified difference of potential in the input circuits of the differential amplifier exists between the base electrodes 135, 136 of the transistors Q11, Q12. More specifically, the differential amplifier controls the voltage at the bases of the transistors Q11, Q12 so that when conduction of the output or collector-emitter circuit of the transistor Q12 is increased, conduction in the output circuit of the transistor Q11 is decreased, and when conduction in the output circuit of the transistor Q12 is decreased, conduction in the output circuit of the transistor Q11 is increased. Thus, when the voltage at the motor terminal 26 increases positively with respect to its voltage at a null condition for the motor, the voltage at the motor terminal 25 decreases correspondingly resulting in a voltage drop across the motor M and establishment of a circuit through the windings of the motor M which can be traced from the terminal B+ through the switch contacts S1, junctions 120–122, junction 130, the collector and emitter of the transistor Q12, terminal 26, through the motor windings to the terminal 25, resistor R21, junctions 125–127 and to the ground G. When the voltage at the motor terminal 26 decreases or changes negatively with respect to its voltage at a null condition for the motor, the voltage at the motor terminal 25 changes positively with respect to its null voltage to establish a circuit through the motor windings which can be traced from the battery terminal B+ through the junctions 120–122, collector 123 and emitter 124 of the transistor Q11, the terminal 25, windings of the motor M, terminal 26, resistor R22, junction 127 and to the ground terminal G.

When the voltage difference between the terminals 25, 26 of the motor increases to a level which is sufficient to energize the motor, the motor is driven in a rotational direction which depends upon the sense of the voltage difference across the motor to move the blend door 12 as described above in reference to FIG. 2.

As previously mentioned the control electrode 135 of the transistor Q11 is connected into the output or collector-emitter circuit of the transistor Q13 at a junction 140 so that the voltage in the output circuit of the transistor Q13 at the junction 140 is effective to provide a forward base to emitter voltage across the transistor Q11 to maintain that transistor in a conductive state. The output circuit of the transistor Q13 can be traced from the terminal B+ of the power supply through the switch contacts S1, junctions 120, 121, a resistor R23, the junction 140, the collector 141 and emitter 142 of the transistor Q13, a junction 144, a resistor R24, junctions 126, 127 and to the ground terminal G of the power supply. It should be apparent that the rate of the conduction of the collector-emitter circuit of the transistor Q13 controls the voltage at the junction 140 connected to the base electrode 135 of the transistor Q11 and therefore variations in the conduction in the transistor Q13 varies conduction in the transistor Q11 accordingly.

The base or control electrode 145 of the transistor Q13 is connected to a junction 146 which forms an output terminal of a voltage divider circuit provided by serially connected resistors R25, R26 and which voltage dividing circuit is connected between the terminals of the battery through the switch S1, junction 120, resistor R25, a junction 147, the junction 146, resistor R26, junctions 125–127 and to the terminal G of the power supply. It will be apparent that since the resistors R25, R26 are of fixed resistance, the voltage at the junction 146 and base 145 of the transistor Q13 is maintained substantially constant and that therefore conduction in the collector-emitter circuit of the transistor Q13 is governed by the voltage level at the junction 144 since the voltage at the junction 144 determines the forward voltage across the base-emitter circuit of the transistor Q13.

The base 136 of the transistor Q12 is connected at a junction 150 to the output or collector-emitter circuit of the transistor Q14 such that the forward voltage across the base-emitter circuit of the transistor Q12 is controlled by emitter current in Q12 and the voltage at the junction 150 which voltage in turn depends upon the amount of conduction in the transistor Q14. The output circuit of the transistor Q14 can be traced from the positive terminal of the battery, B+, through the switch contacts S1, junctions 120–122, 130, a junction 151, a resistor R27, junction 150, collector 152, and emitter 153 of the transistor Q14, the junction 144, resistor R24, junctions 126, 127 and to the negative terminal G of the battery.

The voltage at the base or control electrode 154 of the transistor Q14 is connected by a junction 155 to a signal circuit so that a signal voltage is provided at the junction 155 to control conduction in the base-emitter circuit of the transistor Q14 in response to sensed temperature. The base-emitter circuit of the transistor Q14 may be traced from the terminal B+ through the switch contacts S1, junctions 120–122, 130, 151, a potentiometer P28, a resistor R29, the junction 155, a junction 156, base 154 and emitter 153 of the transistor Q14, the junction 144, resistor R24, junctions 126, 127 through the terminal G.

The potentiometer P28 and resistor R29 are connected in series with potentiometers P30, P31, and a negative temperature coefficient resistor, or thermistor, TR32. The potentiometer P28, resistor R29, potentiometers P30, P31 and thermistor TR32 combine to provide a voltage dividing network having its output junction 155 connected to the transistor Q14 and which voltage dividing network provides a variable output depending on the temperature sensed in the passenger compartment, the passenger compartment temperature selected, and the position of the blend door 12, in a manner which will be more fully described hereinafter.

The potentiometer P31 includes a wiper 157 which is manually adjustable by an occupant of the vehicle so that a desired passenger compartment temperature may be selected and is substantially the same in construction and function as the temperature selector potentiometer P1 described above in reference to FIG. 2. The potentiometer P30 is a calibration potentiometer similar to that described above in reference to the potentiometer P3 of FIG. 2.

When the voltage levels at the junction 155, provided by the temperature responsive voltage dividing network, and the junction 146, provided by the fixed voltage dividing network formed by resistors R25, R26, are equal, the transistors Q13, Q14 conduct at equal rates and the voltages at the bases 135, 136 of the transistors Q11, Q12, respectively, are equal so that a null is produced across the motor M and the blend door 12 is maintained in a particular position to which it had been previously moved by the motor M. If the temperature in the passenger compartment of the vehicle ambient to the thermistor TR32 should increase above the preselected temperature, the resistance of the thermistor TR32 decreases resulting in a decrease in the voltage level at the junction 155 and base 154 of the transistor Q14. When the voltage at the base 154 of the transistor Q14 is reduced as described, a smaller amount of base current is supplied to the transistor Q14 resulting in a decrease in conduction thereof. The decrease in conduction of the transistor Q14, reduces the voltage at the junction 144 associated with the resistor R24 and the collector-emitter circuit of the transistor Q13. Reduction in the voltage at the junction 144 results in an increased forward voltage across the base and emitter of the transistor Q13 such that additional base-emitter current is supplied for that transistor and results in increased conduction in the collector-emitter circuit of the transistor Q13.

Decrease in conduction in the collector-emitter circuit of the transistor Q14 increases the forward voltage across the base-emitter circuit of the transistor Q12 resulting in a greater conduction in the collector-emitter circuit thereof and an increase in the voltage at the terminal 26 of the motor M. At the same time the voltage at the motor terminal 26 is increasing the increase conduction in the collector-emitter circuit of the transistor Q13 is effective to reduce the forward voltage across the base-emitter circuit of the transistor Q11 so as to reduce conduction in the collector-emitter circuit of that transistor and reduce the voltage at the motor terminal 25. When the voltage across the motor terminals is sufficient to energize the motor to move the blend door 12 the blend door is moved toward its position 12c wherein air of a lower temperature is supplied to the passenger compartment of the vehicle.

Conversely, if the temperature of the passenger compartment of the vehicle decreases below the preselected temperature the resistance of the thermistor TR32 increases resulting in an increase in the voltage level of the junction 155 and the base 154 of the transistor Q14 to increase the amount of conduction in the collector-emitter circuit of the transistor Q14. When the collector-emitter circuit of the transistor Q14 becomes more conductive the voltage level at the junction 144 increases resulting in a decrease forward voltage across the base-emitter circuit of the transistor Q13 and accordingly reduce conduction in the collector-emitter circuit of the transistor Q13. Increased conduction in the collector-emitter circuit of the transistor Q14 reduces the voltage level at the base 136 of the transistor Q12 reducing conduction therein and reducing the voltage at the motor terminal 26 with respect to its voltage at a null condition therefor. Reduced conduction in the collector-emitter circuit of the transistor Q13 increases the forward voltage in the base-emitter circuit of the transistor Q11 to increase conduction in that transistor and increase the voltage at the motor terminal 25 with respect to its null voltage. When the voltage across the motor M is sufficiently high the motor is energized to move the blend door toward its position 12d wherein air of a higher temperature is supplied to the passenger compartment of the vehicle.

The control circuit A11 includes position responsive feedback means in the form of the potentiometer P28 having its wiper 160 connected to the linkage L1 between the blend door and the motor M by a linkage L3. The potentiometer P28 is oriented in the circuit so that the error signal produced by a sensed temperature change ambient the thermistor TR32 is reduced in the manner described above in reference to FIG. 2 as the blend door 12 is moved toward one or the other of its positions 12c or 12d. More particularly when the resistance of the thermistor TR32 decreases in response to an increased temperature in the passenger compartment and the motor M is energized to move the blend door 12 toward its position 12c, the linkage L3 moves the wiper 160 of the potentiometer P28 in a direction to reduce the voltage drop thereacross so that the voltage at the base 154 of the transistor Q14 is returned to its null level upon a sufficient amount of movement of the blend door toward its position 12c. When the air temperature in the passenger compartment decreases below the preselected temperature, the resistance of the thermistor TR32 increases and the blend door is moved toward its position 12d resulting in an increase in resistance of the potentiometer P28 until the blend door is in a position wherein the voltage levels at the bases 145, 154 of the transistors Q13, Q14 are substantially equal and produce a null across the motor.

The base 154 of the transistor Q14 and the base 145 of the transistor Q13 are coupled by a capacitor C11 in a manner similar to that described above in reference to the capacitor C1 of FIG. 2 so that circuit transients are prevented from producing static on the vehicle radio.

The transistors Q11–Q14 of the control circuit A11 are all similar transistors differing only in the possible variance in sensitivity from transistor to transistor as noted above. Further, the resistors R23, R27 connected in the collector-emitter circuits of the transistors Q13, Q14, respectively, are identical and the resistors R21, R22 connected in the collector-emitter circuits of the transistors Q11, Q12 are also identical so that the circuit A11 is "symmetrical" in construction. Variations in sensitivity of the individual ones of the transistors Q11–Q14 are minimized due to the construction of the differential amplifier wherein the emitters of the transistors Q13, Q14 are connected together at the junction 144 and due to the emitter follower transistors Q11, Q12 having their emitters connected to the motor terminals 25, 26, respectively.

Due to interconnection between the emitter electrodes 124, 132 of the transistors Q11, Q12 and the motor terminals 25, 26, respectively, relatively smooth and gradual starting of the armature of the motor M is effected. As should be apparent to those familiar with permanent magnet field motors of the type described, a back, or counter, EMF is developed in the windings of the motor as an energizing circuit for the motor is completed therethrough. When the motor terminal 26 is positive with respect to the terminal 25 thereof due to increased conduction in the transistor Q12, the back EMF in the motor windings is effective to retard conduction in the transistor Q12 by raising the voltage level at the emitter 132 thereof relative to the voltage at its base 136 as energizing current builds up in the windings of the motor. As the back EMF developed in the windings of the motor decreases, conduction in the collector-emitter circuit of the transistor Q12 increases accordingly to effect a smooth controlled starting of the armature of the motor M thereby minimizing the possibility of over travel of the blend door 12 as a result of sudden acceleration of the armature thereof to a relatively high rotational speed. Energization of the motor M for rotation in an opposite direction is effected in the same manner.

Figure 4:
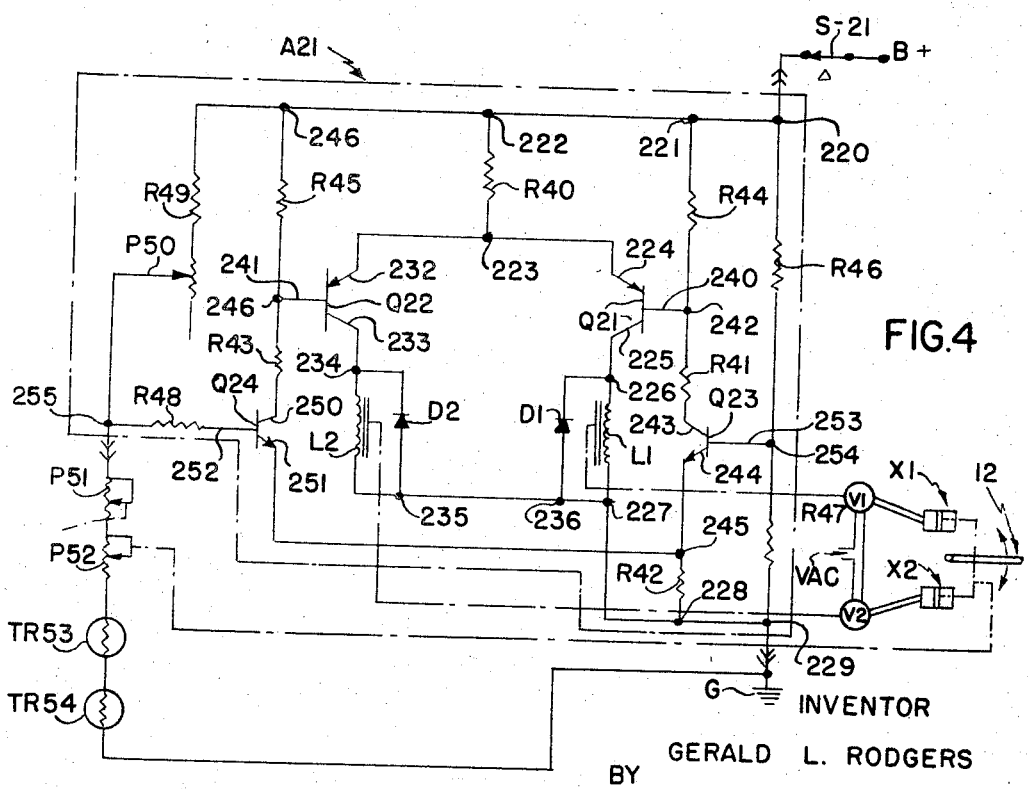
FIG. 4 is a schematic representation of a further modified portion of a temperature control system embodying the present invention.

FIG. 4 illustrates a modified temperature control system embodying the present invention wherein the blend door 12 is moved between its limit positions by the operation of fluid motor, indicated generally at X1, X2, by actuation of solenoid operated control valves V1, V2 which are connected between the motors X1, X2 and a suitable source of pressure such as a vacuum connection from the engine, not shown, of the vehicle.

The valves V1, V2 and the fluid motors Q1, Q2 may be of any suitable construction, but as herein illustrated are such that when the solenoid coils L1, L2 associated with the valves V1, V2, respectively, are energized, the valves V1, V2 vent the motors X1, X2 to atmosphere to maintain the blend door 12 in a predetermined position with respect to the duct system 11. When the solenoid coil L1, for example, is de-energized, the blend door 12 is moved in a counterclockwise direction as viewed in FIG. 4, due to application of vacuum pressure to the motor X1 by the valve V1 and thereby increasing the temperature of the air entering the passenger compartment. When the solenoid coil L2 is de-energized the blend door 12 moves in a clockwise direction, as viewed in FIG. 4, due to application of vacuum pressure to the motor X2 by the valve V2 to provide a decrease in temperature of the air entering the passenger compartment.

Energization of the solenoid coils L1, L2 is effected by a control circuit A21 including first and second stage differential amplifiers which are cooperatively related so that the output of the second stage amplifier controls the solenoid coils in response to differences in input signals in the first stage amplifier. The solenoid coils L1, and L2 are connected in the output or emitter-collector circuits of similar transistors Q21, Q22 which form parallel branches of the second stage differential amplifier. The emitter-collector circuit of the transistor Q21 can be traced from the terminal B+ of the power supply through a control switch S21, a junction 220, a junction 221, junction 222, a resistor R40, a junction 223, the emitter 224 and collector 225 of the transistor Q21, a junction 226, the solenoid coil L1, a junction 227–229 and to the terminal G of the power supply. The energization circuit for the solenoid coil L2 can be traced from the battery terminal B+ through the switch S21, junctions 220–222, resistor R40, a junction 223, emitter 232 and collector 233 of the transistor Q22, a junction 234, the solenoid coil L2, a junction 235, a junction 236, the junctions 227–229 and to the terminal G of the power supply.

The output circuits of the transistors Q21, Q22 conduct in accordance with conduction in their emitter-base circuits respectively. The input or emitter-base circuit of the transistor Q21 is connected between the terminals B+ and G of the power supply through the switch S21, junctions 220–222, resistor R40, junction 223, emitter 224 and base 240 of the transistor Q21, a junction 242, a resistor R41, collector 243 and emitter 244 of the transistor Q23, a junction 245, a resistor R42, and the junctions 228, 229 and to the terminal G. The emitter-base circuit of the transistor Q22 is connected to the terminal B+ through the junction 223, emitter 232 and base 241 of the transistor Q22, a junction 246, a resistor R43, the collector 250, and emitter 251 of a transistor Q24, the junction 245, resistor R42, junctions 228, 229 and to the terminal G. When the voltage levels at the base electrodes, 240, 241 of the transistors Q21, Q22 are equal, identical forward voltages exist across the emitter-base electrodes thereof resulting in equal conduction in their emitter-collector circuits and energization of both solenoid coils L1, L2 to vent the fluid motors X1, X2 to atmospheric pressure and to maintain the blend door in a stationary position. When the voltage at the base electrode 241 is reduced relative to the voltage at the base electrode 240 of the transistor Q21, the transistor Q22 becomes more conductive and lowers the voltage at the junction 223 to reduce conduction in the transistor Q21.

When conduction of the transistor Q21 is reduced to a predetermined level, the solenoid coil L1 is de-energized to operate the valve V1 so as to provide vacuum pressure to the fluid motor X1. With the fluid motor X2 continuing to be vented to atmosphere and the fluid motor X1 exposed to vacuum pressure through the valve V1, the blend door 12 is moved in a counterclockwise direction to provide for higher temperature air flowing to the passenger compartment of the vehicle.

When voltage level at the base 241 of the transistor Q22 increases with respect to the voltage at the base 240 of the transistor Q21, conduction in the transistor Q22 is decreased and upon sufficient decrease in conduction in the emitter-collector circuit of the transistor Q22, the solenoid coil L2 is de-energized to effect movement of the blend door 12 in a clockwise direction as viewed in FIG. 4, to provide lower temperature air to be admitted to the passenger compartment of the vehicle. Diodes D1, D2 are connected in parallel with the solenoid coils L1, L2, respectively and which diodes protect the elements of the circuitry against inductive kicks resulting from de-energization of the solenoid coils.

The voltages at the base electrodes 240, 241 of the transistors Q21, Q22 are controlled by conduction in the collector-emitter circuits of the transistors Q23, Q24 which are connected in parallel branches of the first stage differential amplifier. The transistors Q23, Q24 are similar NPN transistors having their base or control electrodes connected to a fixed voltage source and a variable voltage source respectively. When the voltage level at the bases of the transistors Q23, Q24 are equal, the transistors Q23, Q24 are equally conductive and provide equal voltage levels at the bases 240, 241 of the transistors Q21, Q22. It should be noted that the resistance of the resistor R40 is chosen so that the voltage level at the emitters 224, 232 of the transistors Q21, Q22 is always positive with respect to the voltage level provided at the respective bases thereof when the input voltages for the transistors Q23, Q24 are equal. As should be apparent from the foregoing when the variable input signal to the first stage amplifier changes, conduction in the collector-emitter circuits of the transistors Q23, Q24 changes accordingly, and since the collector-emitter circuits of the transistors Q23, Q24 are coupled to the input circuits of the second stage transistors Q21, Q22, the energization circuits for the solenoid coils L1, L2 are likewise affected.

The collector-emitter circuit of the transistor Q23, connected to the base 240 of the transistor Q21, may be traced from the terminal B+ through the switch S21, junctions 220, 221, a resistor R44, the junction 242 connected to the base 240 of the transistor Q21, the resistor R41, the collector 243, and emitter 244 of the transistor Q23, junction 245, the resistor R42, junctions 228, 229 to the ground terminal G. The collector-emitter circuit of the transistor Q24, is connected from the terminal B+ through the switch S21, junctions 220–222, a junction 246, a resistor R45, the junction 246, resistor R43, collector 250, and emitter 251 of the transistor Q24, junction 245, resistor R42, junctions 228, 229, and to the terminal G.

The base 253 of the transistor Q23 is connected to a voltage divider comprised of the resistors R46, R47 which are connected in series between the terminals of the power supply through the switch S21, junction 220, resistor R46, a junction 254, resistor R47, and the junction 229. The voltage divider establishes a fixed voltage level at the base 253 of the transistor Q23 which is normally positive with respect to the voltage at the emitter thereof so that a base-emitter circuit is established from the terminal B+ through the switch S21, junction 220, resistor R46, junction 254, base 253 and emitter 244 of the transistor Q23, the junction 245, resistor R42, junctions 228, 229 and to the terminal G. The base 252 of the transistor Q24 is connected through a resistor R48 to a voltage dividing network formed by serially connected resistor R49, a calibration potentiometer P50, a temperature selector potentiometer P51, a feedback potentiometer P52 and first and second thermistors TR53, TR54. The base 252 of the transistor Q24 is connected into the voltage dividing network at a junction 255 intermediate the calibration potentiometer P50 and the temperature selector potentiometer P51 at which point the voltage dividing network is effective to provide a voltage level which is generally positive with respect to the voltage at the emitter 251 to establish an input circuit for the transistor Q24 which can be traced from the terminal B+ through the switch S21, junctions 220–222, 246, resistor R49, potentiometer P50, junction 255, resistor R48, base 252 and emitter 251 of the transistor Q24, junction 245, resistor R42, junctions 228, 229 and to the terminal G.

With certain exception, which will be described, the elements of the voltage dividing network associated with the transistor Q24 cooperate in substantially the same manner as described above in reference to FIGS. 2 and 3 so that additional description thereof at this point is not necessary.

Those familiar with solenoid coils will appreciate that the coils are energized, or pulled in, in response to a particular voltage thereacross and remain energized until the voltage thereacross is reduced to a predetermined level which is often considerably lower than the energizing voltage. In the illustrated embodiment, the solenoid coils L1, L2 are identical in construction and are energized at substantially the same voltage thereacross and are de-energized at substantially the same lower voltage. The elements in the circuitry A21 are constructed so that when the voltages at the base electrodes 253, 252 of the transistors Q23, Q24 are the same, both of the solenoid coils L1, L2 are energized. When the temperature sensed by either of the thermistors TR53, TR54 decreases, the voltage at the base electrode 252 of the transistor Q24 increases and conduction in the collector-emitter circuit thereof increases, reducing the voltage at the base electrode 241 of the transistor Q22, to increase the voltage across the energized solenoid coil L2, and reduce the voltage across the solenoid coil L1 as described. When the voltage at the base 252 of the transistor Q24 increases to a predetermined level, the voltage across the solenoid coil L1 is reduced sufficiently to de-energize that solenoid coil, resulting in the aforementioned counterclockwise movement of the blend door 12.

The feedback potentiometer P52 is connected to the drive mechanism for the blend door 12 and as the blend door moves, the voltage at the base 252 of the transistor Q24 is reduced thereby decreasing conduction in the transistors Q22, Q24 and increasing conduction in the transistors Q23, Q21. When the transistor Q21 is conducting sufficiently to provide an energizing voltage across the solenoid coil L1, the valve V1 associated therewith is actuated to vent the motor X1 and since the solenoid coil L2 has remained energized the motor X2 is similarly vented so that movement of the blend door 12 is stopped and the door is maintained at a stationary position.

When the temperature sensed by either of the thermistors TR53 or TR 54 increase, the voltage at the base 252 of the transistor Q24 is reduced, rendering the transistors Q24, Q22 less conductive and resulting in greater conduction in the transistors Q23, Q21. When the voltage at the base 252 has decreased sufficiently to effect de-energization of the solenoid coil L2, the valve V2 associated therewith exposes the fluid motor X2 to vacuum resulting in a clockwise movement of the blend door 12. Clockwise movement of the blend door 12 increases the resistance of the feedback potentiometer P52 as described above so as to increase the voltage level at the base 250 to the transistor Q24 until such time as the solenoid coil L2 is re-energized and the blend door 12 maintained in position.

The thermistor TR53 is a negative temperature coefficent thermistor similar to those described above, and preferably positioned in the passenger compartment of the vehicle to sense passenger compartment temperatures. The thermistor TR54 is likewise a negative temperature coefficient resistor and is preferably located in the fresh air duct of the duct system 11 so as to be responsive to temperature changes of air outside the vehicle and alter the position of the blend door 12 in anticipation of such temperature changes affecting the temperature within the vehicle.

Values of typical circuit elements which can be used to construct the circuitry of FIG. 2 are listed below:

Resistors:

| | | |
|---|---|---|
| R1 | Ohms | 560 |
| R2 | do | 39 |
| R3 | do | 560 |
| R4 | do | 2.4K |
| R5 | do | 390 |
| R6 | do | 120 |
| R7 | do | 510 |
| R8 | do | 1.5K |
| R9 | do | 1.5K |
| R10 | do | 1K |
| R14 | do | 1.5K |
| R16 | do | 1.5K |
| R17 | do | 1.5K |
| R18 | do | 6.8K |

Potentiometers:

| | | |
|---|---|---|
| P1 | ohms | 1.1K |
| P2 | do | 450 |
| P3 | do | 1.5K |

Thermistor:

| | | |
|---|---|---|
| TR1 @ 25° C. | ohms | 1616 |

Capacitors:

| | | |
|---|---|---|
| C1 | mf | 0.01 |

Transistors:

| | |
|---|---|
| Q1 | MPS 6515 |
| Q2 | MPS 6515 |
| Q3 | MPS 6517 |
| Q4 | MPS 6517 |

Power supply:

| | | |
|---|---|---|
| Battery | v. DC | 12 |

Values of the circuit elements of FIG. 3 are as follows:

Resistors:

| | | |
|---|---|---|
| R21 | ohms | 390 |
| R22 | do | 390 |
| R23 | do | 820 |
| R24 | do | 1.2K |
| R25 | do | 1.2K |
| R26 | do | 1.2K |
| R27 | do | 820 |
| R29 | do | 2.4K |

Potentiometers:

| | | |
|---|---|---|
| P28 | ohms | 450 |
| P30 | do | 1.5K |
| P31 | do | 1K |

Thermistor:

| | | |
|---|---|---|
| TR32 @25° C. | ohms | 1616 |

Capacitor:

| | | |
|---|---|---|
| C1 | mf | 0.01 |

Transistors:

| | |
|---|---|
| Q11 | MPS 6515 |
| Q12 | MPS 6515 |
| Q13 | MPS 6515 |
| Q14 | MPS 6515 |

Power supply:

| | | |
|---|---|---|
| Battery | v. DC | 12 |

Values of circuit elements of FIG. 4 are as follows:

Resistors:

| | | |
|---|---|---|
| R40 | ohms | 6.8 |
| R41 | do | 820 |
| R42 | do | 1.2K |
| R43 | do | 820 |
| R44 | do | 1.5K |
| R45 | do | 1.5K |
| R46 | do | 510 |
| R47 | do | 510 |
| R48 | do | 1K |
| R49 | do | 2K |

Potentiometers:

| | | |
|---|---|---|
| P50 | ohms | 500 |
| P51 | do | 1K |
| P52 | do | 450 |

Thermistors:

| | | |
|---|---|---|
| TR53 @ 25° C. | ohms | 1616 |
| TR54 @ 25° C. | do | 1616 |

Diodes:

| | |
|---|---|
| D1 | IN 456 A |
| D2 | IN 456 A |

Transistors:
  Q21 ———————————————————— MPS 6534
  Q22 ———————————————————— MPS 6534
  Q23 ———————————————————— MPS 6515
  Q24 ———————————————————— MPS 6515
Power supply:
  Battery ————————————————v. DC__   12

From the foregoing, it will be apparent that the objects heretofore enumerated and others have been accomplished and that there has been provided a novel and improved temperature control system. While three preferred embodiments of the present invention have been illustrated and described herein in considerable detail, it is not intended that the present invention be considered to be limited to the particular details of the construction shown, the circuitry A and A11 and motor M for example, could control operation of a valve in the heater core H and vary the flow of engine coolant therein and control passenger compartment temperatures accordingly. Moreover, additional thermistors could be utilized in the input circuits of the circuitry A, A11, of FIGS. 1 and 2, such as ambient temperature sensing thermistors, as described in reference to FIG. 3, and which thermistors could, for example, be suitably positioned in the inlet portion of the duct system 11 to anticipate changes in ambient air temperature and to control positioning of the blend door accordingly. It is therefore my intention to cover hereby all adaptations, modifications and uses of the present invention which fall within the scope of the appended claims.

Having described my invention, I claim:

1. In an air tempering system having a heat exchanger and duct means for directing air past said heat exchanger to an air space to be conditioned, a member movable to change the amount of heat transferred between said heat exchanger and air in said duct means, electrically energizable actuating means for controllling positioning of said movable member in response to temperature in said air space, differential amplifier means having an output circuit connected to said actuating means and an input circuit including a temperature responsive element in said air space, a variable resistance element for providing a voltage level at a point in said input circuit corresponding to a desired air temperature in said air space, and feedback means including a part which is movable according to movement of said movable member, said temperature responsive element effective to change said voltage level at said point in said input circuit in response to a sensed air space temperature different from said preselected temperature to effect operation of said actuating means and movement of said member, and with said feedback means operable to return said voltage level to said preselected level in response to movement of said member, said actuating means comprising a permanent magnet field motor drivingly connected to said movable member and electrically connected across the output of said differential amplifier means, said amplifier means including conductive output elements through which motor energizing current flow is inhibited by counter EMF developed by said motor on starting whereby said motor is started gradually to prevent overtravel of said movable member.

2. An air tempering system as defined in claim 1 wherein said out elements are transistors having output circuits thereof connected in parallel, and said motor having first and second terminals connected to said output circuits respectively, said transistors cooperating to change the voltage level across said terminals in response to changes in sensed temperature.

3. In an air tempering system having a heat exchanger and duct means for directing air past said heat exchanger to an air space to be conditioned, a member movable to change the amount of heat transferred between said heat exchanger and air in said duct means, electrically energizable actuating means for controlling positioning of said movable member in response to temperature in said air space, differential amplifier means having an output circuit connected to said actuating means and an input circuit including a temperature responsive element in said air space, a variable resistance element for providing a voltage level at a point in said input circuit corresponding to a desired air temperature in said air space, and feedback means including a part which is movable according to movement of said movable member, said temperature responsive element effective to change said voltage level at said point in said input circuit in response to a sensed air space temperature different from said preselected temperature to effect operation of said actuating means and movement of said member, and with said feedback means operable to return said voltage level to said preselected level in response to movement of said member, said differential amplifier means including first and second transistors, said first transistor including a control electrode connected to circuit elements for providing a substantially constant voltage level at said control electrode, said second transistor having a control electrode connected to said point in said input circuit, third and fourth transistors having control electrodes connected to output circuits of said first and second transistors respectively and output circuits connected in parallel, and first and second solenoids connected in said output circuits of said third and fourth transistors respectively, said solenoids forming part of said actuating means and associated with valve means for controlling the position of said movable member, said movable member comprising a vane-like member supported for pivotal movement in said duct means and movable between a first position wherein air in said duct means is directed across said heat exchanger and a second position wherein air is diverted from said heat exchanger, said actuating means further including fluid operated motors connected to said vane-like member and communicating with said valve means, said fluid motors operative to control positioning of said vane-like member at said first and second positions and at positions intermediate said first and second positions.

4. In an air tempering system having a heat exchanger and duct means for directing air past said heat exchanger to an air space to be conditioned, a member movable to change the amount of heat transferred between said heat exchanger and air in said duct means, electrically energizable actuating means for controlling positioning of said movable member in response to temperature in said air space, differential amplifier means having an output circuit connected to said actuating means and an input circuit including a temperature responsive element in said air space, a variable resistance element for providing a voltage level at a point in said input circuit corresponding to a desired air temperature in said air space, and feedback means including a part which is movable according to movement of said movable member, said temperature responsive element effective to change said voltage level at said point in said input circuit in response to a sensed air space temperature different from said preselected temperature to effect operation of said actuating means and movement of said member, and with said feedback means operable to return said voltage level to said preselected level in response to movement of said member, said differential amplifier means including first and second transistors having their output circuits connected in parallel across terminals of a power supply, one of said transistors having a substantially constant voltage level at its control electrode and said other transistor having its control electrode connected to a point in said input circuit having a voltage level which varies with temperature, third and fourth transistors connected to said first and second transistors respectively having their output circuits connected in parallel across said power supply and with said actuating means connected in said output circuits of said third and fourth transistors, said actuating means including a DC electric motor and said third and fourth transistors are NPN transistors, said motor having terminals connected into said output circuits of said third and fourth transistors at the emitter electrodes thereof, and wherein a counter EMF produced by said motor upon establishment of a voltage across the terminals thereof is effective to inhibit conduction in one of said third and fourth transistors to provide for smooth starting of said motor.

5. In an air tempering system having a heat exchanger and duct means for directing air past said heat exchanger to an air space to be conditioned, a member movable to change the amount of heat transferred between said heat exchanger and air in said duct means, electrically energizable actuating means for controlling positioning of said movable member in response to temperature in said air space differential amplifier means having an output circuit connected to said actuating means and an input circuit including a temperature responsive element in said air space, a variable resistance element for providing a voltage level at a point in said input circuit corresponding to a desired air temperature in said air space, aid feedback means including a part which is movable according to movement of said movable member, said temperature responsive element effective to change said voltage level at said point in said input circuit in response to a sensed air space temperature different from said preselected temperature to effect operation of said actuating means and movement of said member, and with said feedback means operable to return said voltage level to said preselected level in response to movement of said member, said differential amplifier means including first and second transistors having their output circuits connected in parallel across terminals of a power supply. One of said transistors having a substantially canstant voltage level at its control electrode and said other transistor having its control electrode connected to a point in said input circuit having a voltage level which varies with temperature, third and fourth transistors connected to said first and second transistors respectively having their output circuits connected in parallel across said power supply and with said actuating means connected in said output circuits of said third and fourth transistors, and negative feedback means connected between the input circuit of said one of said first and second transistors and the output circuit of said third transistor, and with said negative feedback means minimizing the effects of varying sensitivities of the transistors in said amplifier means.

6. A temperature control system for an automotive vehicle comprising duct means for directing air to a passenger compartment, a heat exchanger in said duct means in heat exchange relationship with air flowing thereacross, a member movable to change the amount of heat exchange between said heat exchanger and air in said duct means, and means controlling positioning of said member in response to temperature in said passenger compartment including electrically operated actuating means for effecting movement of said member, and differential amplifier means for controlling operation of said electrically operated actuating means, said differential amplifier means including a signal circuit comprising a temperature responsive resistance element, a variable resistance element varied to provide a preselected voltage level at a point in said signal circuit corresponding to a desired air temperature in said passenger compartment, and a variable feedback resistance having a resistance which varies according to positioning of said member, said amplifier controlling operation of said actuating means and said movable member in response to sensed temperature in said passenger compartment, said actuating means including first and second fluid motors connected to said movable member and first and second solenoid operated valve means controlling operation of said motors, said solenoids of said valve means connected in output circuits of said differential amplifier means.

7. A temperature control system for an automotive vehicle comprising duct means for directing air to a passenger compartment, a heat exchanger in said duct means in heat exchange relationship with air flowing thereacross, a member movable to change the amount of heat exchange between said heat exchanger and air in said duct means, and means controlling positioning of said member in response to temperature in said passenger compartment including electrically operated actuating means for effecting movement of said member, and differential amplifier means for controlling operation of said electrically operated actuating means, said differential amplifier means including a signal circuit comprising a temperature responsive resistance element, a variable resistance element varied to provide a preselected voltage level at a point in said signal circuit corresponding to a desired air temperature in said passenger compartment, and a variable feedback resistance having a resistance which varies according to positioning of said member, said amplifier controlling operation of said actuating means and said movable member in response to sensed temperature in said passenger compartment, said amplifier means including first and second transistors, said first transistor having its control electrode connected to circuit elements providing a predetermined relatively constant voltage thereto, said second transistor having its control electrode connected to said point in said signal circuit with conduction thereof controlled by said voltage level, said first and second transistors having output circuits connected in parallel, and third and fourth transistors having control electrodes connected to said output circuits of said first and second transistors, respectively, said electrically operated actuating means connected to output circuits of said third and fourth transistors and effective to change the position of said movable member in response to change of said voltage level at said point in said signal circuit, said third and fourth transistors being emitter follower transistors and said electrically energized actuating means comprising a permanent magnet field DC motor connected between the emitter electrodes of said third and fourth transistors, wherein a back EMF created by current through said electric motor inhibits conduction of one of said third and fourth transistors to provide for a gradual voltage rise across said motor and smooth starting thereof, and capacitance means connected between said control electrodes of said first and second transistors, said capacitance means effective to prevent circuit transients from being amplified by said differential amplifier means and applied across said electric motor.

8. A temperature control system for an automotive vehicle comprising duct means for directing air to a passenger compartment, a heat exchanger in said duct means in heat exchange relationship with air flowing thereacross, a member movable to change the amount of heat exchange between said heat exchanger and air in said duct means, and means controlling positioning of said member in response to temperature in said passenger compartment including electrically operated actuating means for effecting movement of said member, and differential amplifier means for controlling operation of said electrically operated actuating means, said differential amplifier means including a signal circuit comprising a temperature responsive resistance element, a variable resistance element varied to provide a preselected voltage level at a point in said signal circuit corresponding to a desired air temperature in said passenger compartment, and a variable feedback resistance having resistance which varies according to positioning of said member, said amplifier controlling operation of said actuating means and said movable member in response to sensed temperature in said passenger compartment, said amplifier means including first and second transistors, said first transistor having its control electrode connected to circuit elements providing a predetermined relatively constant voltage thereto, said second transistor having its control electrode connected to said point in said signal circuit with conduction thereof controlled by said voltage level, said first and second transistors having output circuits connected in parallel, and third and fourth transistors having control electrodes connected to said output circuits of said first and second transistors, respectively, said electrically operated actuating means connected to output circuits of said third and fourth transistors and effective to change the position of said movable member in response to change in said voltage level at said point in said signal circuit, said output circuits of said third and fourth transistors being connected in parallel, and negative feedback means connected between an input circuit for said second transistor and the output circuit for said third transistor for minimizing the effects of varying sensitivities between said third and fourth transistors.

9. A temperature control system for an automotive vehicle comprising duct means for directing air to a passenger compartment, a heat exchanger in said duct means in heat exchange relationship with air flowing thereacross, a member movable to change the amount of heat exchange between said heat exchanger and air in said duct means, and means controlling positioning of said member in response to temperature in said passenger compartment including electrically operated actuating means for effecting movement of said member, and differential amplifier means for controlling operation of said electrically operated actuating means, said differential amplifier means including a signal circuit comprising a temperature responsive element, a variable resistance element varied to provide a preselected voltage level at a point in said signal circuit corresponding to a desired air temperature in said passenger compartment, and a variable feedback resistance having a resistance which varies according to positioning of said member, said amplifier controlling operation of said actuating means and said movable member in response to sensed temperature in said passenger compartment, and blower means in said duct means, said blower means including an electrically energized blower motor connected in a series with a variable resistance means across terminals of the power supply, and means drivingly connecting said variable resistance means to said actuating means for controlling the speed of said blower motor in response to operation of said actuating means.

10. In an air tempering system having a heat exchanger and duct means for directing air past said heat exchanger to an air space to be conditioned, a member movable to change the amount of heat transferred between said heat exchanger and air in said duct means, electrically energizable actuating means for controlling positioning of said movable member in response to temperature in said air space, differential amplifier means having a reference side and a signal side, said actuating means connected to said amplifier and operated in response to an output of said amplifier, said reference and signal sides each comprised of at least one transistor said signal side including an input circuit including a temperature responsive element in said air space, a circuit element for providing a voltage level at a point in said input circuit correspondng to a desired air temperature in said air space, and feedback means including a part which is movable according to movement of said movable member, said temperature responsive element effective to change said voltage level at said point in said input circuit in response to sensed air space temperature different from said preselected temperature to alter said output signal and effect operation of said actuating means and movement of said member, said feedback means operable to return said voltage level to said preselected level in response to movement of said member and negative feedback means connected between said signal and reference sides of said amplifier to minimize the difference in sensitivities between transistors in said amplifier.

References Cited

UNITED STATES PATENTS

| | | | |
|---|---|---|---|
| 2,782,994 | 2/1957 | Dotson | 236—13 X |
| 2,782,995 | 2/1957 | McCormack | 236—78 |
| 3,144,564 | 8/1964 | Sikorra | 307—88.5 |
| 3,247,462 | 4/1966 | Kobbe | 330—30 |
| 3,262,066 | 7/1966 | Trilling | 330—69 |
| 3,273,060 | 9/1966 | Schneider | 330—30 |
| 3,315,730 | 4/1967 | Weaver et al. | 165—23 |

ROBERT A. O'LEARY, *Primary Examiner.*

W. E. WAYNER, *Assistant Examiner.*